United States Patent
Toyoyama et al.

(10) Patent No.: US 6,724,812 B2
(45) Date of Patent: Apr. 20, 2004

(54) MATCHING FILTER CALCULATING CORRELATION VALVE UTILIZING EXCLUSIVE-OR OF TWO DATA AND EXCLUSIVE-OR OF TWO CODES CORRESPONDING TO THE INPUT DATA

(75) Inventors: Shinji Toyoyama, Sakurai (JP); Yuichi Sato, Mie-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 417 days.

(21) Appl. No.: 09/725,763

(22) Filed: Nov. 30, 2000

(65) Prior Publication Data
US 2001/0009575 A1 Jul. 26, 2001

(30) Foreign Application Priority Data
Nov. 30, 1999 (JP) ............................................. 11-339677

(51) Int. Cl.[7] .......................... H04B 15/00; H04K 1/00; H04L 27/30
(52) U.S. Cl. ....................... 375/152; 375/143; 375/343
(58) Field of Search ............................... 375/152, 207, 375/150; 708/3

(56) References Cited

U.S. PATENT DOCUMENTS

| | | | | | |
|---|---|---|---|---|---|
| 5,132,986 A | * | 7/1992 | Endo et al. | .................. | 375/142 |
| 5,373,531 A | * | 12/1994 | Kawasaki | .................... | 375/150 |
| 5,761,239 A | * | 6/1998 | Gold et al. | .................. | 375/150 |
| 5,907,576 A | * | 5/1999 | Endo | .......................... | 375/130 |
| 5,946,344 A | * | 8/1999 | Warren et al. | .............. | 375/150 |
| 6,188,714 B1 | * | 2/2001 | Yamaguchi | .................. | 375/130 |
| 6,389,438 B1 | * | 5/2002 | Zhou | ............................ | 708/3 |
| 6,456,668 B1 | * | 9/2002 | MacLellan et al. | ......... | 375/283 |

FOREIGN PATENT DOCUMENTS

JP  9-107271  4/1997

* cited by examiner

*Primary Examiner*—Mohammad H. Ghayour
(74) *Attorney, Agent, or Firm*—Birch, Stewart, Kolasch & Birch, LLP

(57) ABSTRACT

A matched filter has a circuit calculating an exclusive-OR of two input data, a circuit calculating an exclusive-OR of two codes corresponding to the two input data, respectively, and a correlation processor. The correlation processor, using the exclusive-OR of the two input data, one of the two input data, the exclusive-OR of the two codes, and the code corresponding to one of the two input data, calculates a correlation value of the two input data and the two codes.

14 Claims, 16 Drawing Sheets

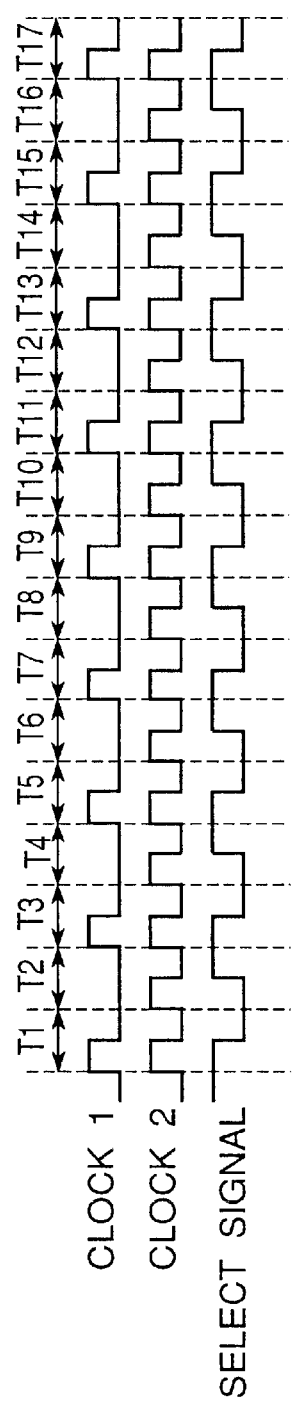

Fig.4

| TIME | OUTPUT OF DELAY 1 | OUTPUT OF DELAY 2 | OUTPUT OF DELAY 3 | OUTPUT OF DELAY 4 | OUTPUT OF DELAY 5 | OUTPUT OF DELAY 6 | OUTPUT OF DELAY 7 | OUTPUT OF DELAY 8 |
|---|---|---|---|---|---|---|---|---|
| T1  | D1  | D1        |     |           |     |           |     |           |
| T2  | D1  | D1⊕D2     |     |           |     |           |     |           |
| T3  | D3  | D3        | D1  | D1⊕D2     |     |           |     |           |
| T4  | D3  | D3⊕D4     | D1  | D1⊕D2     |     |           |     |           |
| T5  | D5  | D5        | D3  | D3⊕D4     | D1  | D1⊕D2     |     |           |
| T6  | D5  | D5⊕D6     | D3  | D3⊕D4     | D1  | D1⊕D2     |     |           |
| T7  | D7  | D7        | D5  | D5⊕D6     | D3  | D3⊕D4     | D1  | D1⊕D2     |
| T8  | D7  | D7⊕D8     | D5  | D5⊕D6     | D3  | D3⊕D4     | D1  | D1⊕D2     |
| T9  | D9  | D9⊕D2     | D7  | D7⊕D8     | D5  | D5⊕D6     | D3  | D3⊕D4     |
| T10 | D9  | D9⊕D10    | D7  | D7⊕D8     | D5  | D5⊕D6     | D3  | D3⊕D4     |
| T11 | D11 | D11⊕D4    | D9  | D9⊕D10    | D7  | D7⊕D8     | D5  | D5⊕D6     |
| T12 | D11 | D11⊕D12   | D9  | D9⊕D10    | D7  | D7⊕D8     | D5  | D5⊕D6     |
| T13 | D13 | D13⊕D6    | D11 | D11⊕D12   | D9  | D9⊕D10    | D7  | D7⊕D8     |
| T14 | D13 | D13⊕D14   | D11 | D11⊕D12   | D9  | D9⊕D10    | D7  | D7⊕D8     |
| T15 | D15 | D15⊕D8    | D13 | D13⊕D14   | D11 | D11⊕D12   | D9  | D9⊕D10    |
| T16 | D15 | D15⊕D16   | D13 | D13⊕D14   | D11 | D11⊕D12   | D9  | D9⊕D10    |
| T17 | D17 | D17⊕D10   | D15 | D15⊕D16   | D13 | D13⊕D14   | D11 | D11⊕D12   |

Fig.5

| TIME | CODE 1 | CODE 2 | CODE 3 | CODE 4 | CODE 5 | CODE 6 | CODE 7 | CODE 8 |
|---|---|---|---|---|---|---|---|---|
| T1 | S8 | S1 | S2 | S3 | S4 | S5 | S6 | S7 |
| T2 | S1 | S2 | S3 | S4 | S5 | S6 | S7 | S8 |
| T3 | S8 | S1 | S2 | S3 | S4 | S5 | S6 | S7 |
| T4 | S1 | S2 | S3 | S4 | S5 | S6 | S7 | S8 |
| T5 | S8 | S1 | S2 | S3 | S4 | S5 | S6 | S7 |
| T6 | S1 | S2 | S3 | S4 | S5 | S6 | S7 | S8 |
| T7 | S8 | S1 | S2 | S3 | S4 | S5 | S6 | S7 |
| T8 | S1 | S2 | S3 | S4 | S5 | S6 | S7 | S8 |
| T9 | S8 | S1 | S2 | S3 | S4 | S5 | S6 | S7 |
| T10 | S1 | S2 | S3 | S4 | S5 | S6 | S7 | S8 |
| T11 | S8 | S1 | S2 | S3 | S4 | S5 | S6 | S7 |
| T12 | S1 | S2 | S3 | S4 | S5 | S6 | S7 | S8 |
| T13 | S8 | S1 | S2 | S3 | S4 | S5 | S6 | S7 |
| T14 | S1 | S2 | S3 | S4 | S5 | S6 | S7 | S8 |
| T15 | S8 | S1 | S2 | S3 | S4 | S5 | S6 | S7 |
| T16 | S1 | S2 | S3 | S4 | S5 | S6 | S7 | S8 |
| T17 | S8 | S1 | S2 | S3 | S4 | S5 | S6 | S7 |

Fig.6

| TIME | INPUT D OF CORRELATION PROCESSOR 13 | INPUT C OF CORRELATION PROCESSOR 13 | INPUT D OF CORRELATION PROCESSOR 14 | INPUT C OF CORRELATION PROCESSOR 14 | INPUT D OF CORRELATION PROCESSOR 15 | INPUT C OF CORRELATION PROCESSOR 15 | INPUT D OF CORRELATION PROCESSOR 16 | INPUT C OF CORRELATION PROCESSOR 16 |
|---|---|---|---|---|---|---|---|---|
| T1 | S1 | S8⊕S1 | S3 | S2⊕S3 | S5 | S4⊕S5 | S7 | S6⊕S7 |
| T2 | S2 | S1⊕S2 | S4 | S3⊕S4 | S6 | S5⊕S6 | S8 | S7⊕S8 |
| T3 | S1 | S8⊕S1 | S3 | S2⊕S3 | S5 | S4⊕S5 | S7 | S6⊕S7 |
| T4 | S2 | S1⊕S2 | S4 | S3⊕S4 | S6 | S5⊕S6 | S8 | S7⊕S8 |
| T5 | S1 | S8⊕S1 | S3 | S2⊕S3 | S5 | S4⊕S5 | S7 | S6⊕S7 |
| T6 | S2 | S1⊕S2 | S4 | S3⊕S4 | S6 | S5⊕S6 | S8 | S7⊕S8 |
| T7 | S1 | S8⊕S1 | S3 | S2⊕S3 | S5 | S4⊕S5 | S7 | S6⊕S7 |
| T8 | S2 | S1⊕S2 | S4 | S3⊕S4 | S6 | S5⊕S6 | S8 | S7⊕S8 |
| T9 | S1 | S8⊕S1 | S3 | S2⊕S3 | S5 | S4⊕S5 | S7 | S6⊕S7 |
| T10 | S2 | S1⊕S2 | S4 | S3⊕S4 | S6 | S5⊕S6 | S8 | S7⊕S8 |
| T11 | S1 | S8⊕S1 | S3 | S2⊕S3 | S5 | S4⊕S5 | S7 | S6⊕S7 |
| T12 | S2 | S1⊕S2 | S4 | S3⊕S4 | S6 | S5⊕S6 | S8 | S7⊕S8 |
| T13 | S1 | S8⊕S1 | S3 | S2⊕S3 | S5 | S4⊕S5 | S7 | S6⊕S7 |
| T14 | S2 | S1⊕S2 | S4 | S3⊕S4 | S6 | S5⊕S6 | S8 | S7⊕S8 |
| T15 | S1 | S8⊕S1 | S3 | S2⊕S3 | S5 | S4⊕S5 | S7 | S6⊕S7 |
| T16 | S2 | S1⊕S2 | S4 | S3⊕S4 | S6 | S5⊕S6 | S8 | S7⊕S8 |
| T17 | S1 | S8⊕S1 | S3 | S2⊕S3 | S5 | S4⊕S5 | S7 | S6⊕S7 |

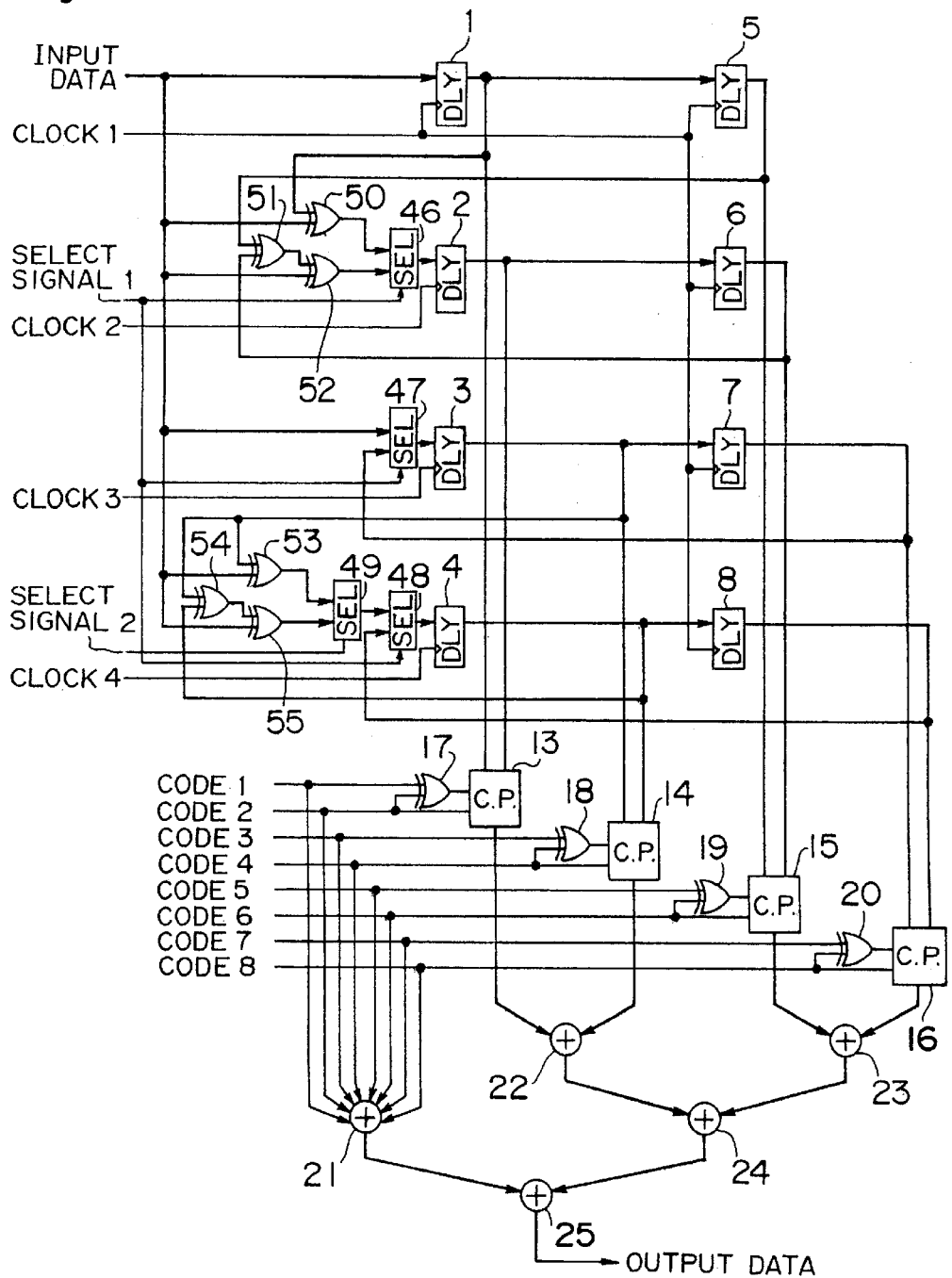

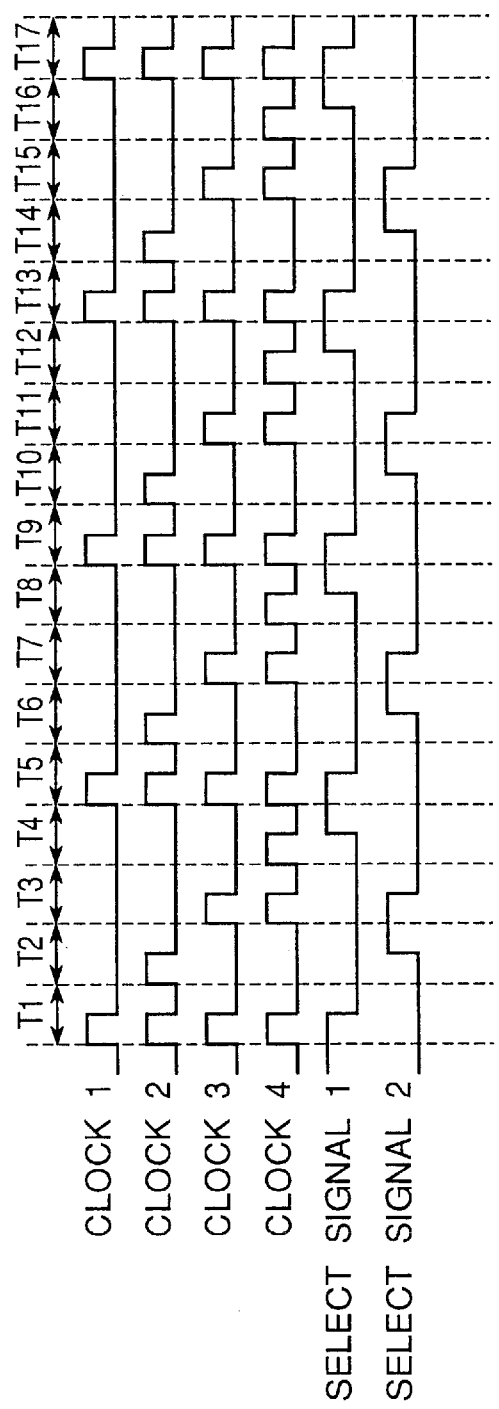

Fig.9

| TIME | OUTPUT OF DELAY 1 | OUTPUT OF DELAY 2 | OUTPUT OF DELAY 3 | OUTPUT OF DELAY 4 | OUTPUT OF DELAY 5 | OUTPUT OF DELAY 6 | OUTPUT OF DELAY 7 | OUTPUT OF DELAY 8 |
|---|---|---|---|---|---|---|---|---|
| T1  | D1  | D1 |  |  |  |  |  |  |
| T2  | D1  | D1⊕D2 |  |  |  |  |  |  |
| T3  | D1  | D1⊕D2 | D3  | D3 |  |  |  |  |
| T4  | D1  | D1⊕D2 | D3  | D3⊕D4 |  |  |  |  |
| T5  | D5  | D5 |  |  | D1  | D1⊕D2 | D3  | D3⊕D4 |
| T6  | D5  | D5⊕D6 |  |  | D1  | D1⊕D2 | D3  | D3⊕D4 |
| T7  | D5  | D5⊕D6 | D7  | D7 | D1  | D1⊕D2 | D3  | D3⊕D4 |
| T8  | D5  | D5⊕D6 | D7  | D7⊕D8 | D1  | D1⊕D2 | D3  | D3⊕D4 |
| T9  | D9  | D9⊕D2 | D3  | D3⊕D4 | D5  | D5⊕D6 | D7  | D7⊕D8 |
| T10 | D9  | D9⊕D10 | D3  | D3⊕D4 | D5  | D5⊕D6 | D7  | D7⊕D8 |
| T11 | D9  | D9⊕D10 | D11 | D11⊕D4 | D5  | D5⊕D6 | D7  | D7⊕D8 |
| T12 | D9  | D9⊕D10 | D11 | D11⊕D12 | D5  | D5⊕D6 | D7  | D7⊕D8 |
| T13 | D13 | D13⊕D6 | D7  | D7⊕D8 | D9  | D9⊕D10 | D11 | D11⊕D12 |
| T14 | D13 | D13⊕D14 | D7  | D7⊕D8 | D9  | D9⊕D10 | D11 | D11⊕D12 |
| T15 | D13 | D13⊕D14 | D15 | D15⊕D8 | D9  | D9⊕D10 | D11 | D11⊕D12 |
| T16 | D13 | D13⊕D14 | D15 | D15⊕D16 | D9  | D9⊕D10 | D11 | D11⊕D12 |
| T17 | D17 | D17⊕D10 | D11 | D11⊕D12 | D13 | D13⊕D14 | D15 | D15⊕D16 |

Fig.10

| TIME | CODE 1 | CODE 2 | CODE 3 | CODE 4 | CODE 5 | CODE 6 | CODE 7 | CODE 8 |
|---|---|---|---|---|---|---|---|---|
| T1 | S1 | S8 | S7 | S6 | S5 | S4 | S3 | S2 |
| T2 | S2 | S1 | S8 | S7 | S6 | S5 | S4 | S3 |
| T3 | S3 | S2 | S1 | S8 | S7 | S6 | S5 | S4 |
| T4 | S4 | S3 | S2 | S1 | S8 | S7 | S6 | S5 |
| T5 | S1 | S8 | S7 | S6 | S5 | S4 | S3 | S2 |
| T6 | S2 | S1 | S8 | S7 | S6 | S5 | S4 | S3 |
| T7 | S3 | S2 | S1 | S8 | S7 | S6 | S5 | S4 |
| T8 | S4 | S3 | S2 | S1 | S8 | S7 | S6 | S5 |
| T9 | S1 | S8 | S7 | S6 | S5 | S4 | S3 | S2 |
| T10 | S2 | S1 | S8 | S7 | S6 | S5 | S4 | S3 |
| T11 | S3 | S2 | S1 | S8 | S7 | S6 | S5 | S4 |
| T12 | S4 | S3 | S2 | S1 | S8 | S7 | S6 | S5 |
| T13 | S1 | S8 | S7 | S6 | S5 | S4 | S3 | S2 |
| T14 | S2 | S1 | S8 | S7 | S6 | S5 | S4 | S3 |
| T15 | S3 | S2 | S1 | S8 | S7 | S6 | S5 | S4 |
| T16 | S4 | S3 | S2 | S1 | S8 | S7 | S6 | S5 |
| T17 | S1 | S8 | S7 | S6 | S5 | S4 | S3 | S2 |

Fig.11

| TIME | INPUT D OF CORRELATION PROCESSOR 13 | INPUT C OF CORRELATION PROCESSOR 13 | INPUT D OF CORRELATION PROCESSOR 14 | INPUT C OF CORRELATION PROCESSOR 14 | INPUT D OF CORRELATION PROCESSOR 15 | INPUT C OF CORRELATION PROCESSOR 15 | INPUT D OF CORRELATION PROCESSOR 16 | INPUT C OF CORRELATION PROCESSOR 16 |
|---|---|---|---|---|---|---|---|---|
| T1  | S1 | S8⊕S1 | S7 | S6⊕S7 | S5 | S4⊕S5 | S3 | S2⊕S3 |
| T2  | S2 | S1⊕S2 | S8 | S7⊕S8 | S6 | S5⊕S6 | S4 | S3⊕S4 |
| T3  | S3 | S2⊕S3 | S1 | S8⊕S1 | S7 | S6⊕S7 | S5 | S4⊕S5 |
| T4  | S4 | S3⊕S4 | S2 | S1⊕S2 | S8 | S7⊕S8 | S6 | S5⊕S6 |
| T5  | S1 | S8⊕S1 | S7 | S6⊕S7 | S5 | S4⊕S5 | S3 | S2⊕S3 |
| T6  | S2 | S1⊕S2 | S8 | S7⊕S8 | S6 | S5⊕S6 | S4 | S3⊕S4 |
| T7  | S3 | S2⊕S3 | S1 | S8⊕S1 | S7 | S6⊕S7 | S5 | S4⊕S5 |
| T8  | S4 | S3⊕S4 | S2 | S1⊕S2 | S8 | S7⊕S8 | S6 | S5⊕S6 |
| T9  | S1 | S8⊕S1 | S7 | S6⊕S7 | S5 | S4⊕S5 | S3 | S2⊕S3 |
| T10 | S2 | S1⊕S2 | S8 | S7⊕S8 | S6 | S5⊕S6 | S4 | S3⊕S4 |
| T11 | S3 | S2⊕S3 | S1 | S8⊕S1 | S7 | S6⊕S7 | S5 | S4⊕S5 |
| T12 | S4 | S3⊕S4 | S2 | S1⊕S2 | S8 | S7⊕S8 | S6 | S5⊕S6 |
| T13 | S1 | S8⊕S1 | S7 | S6⊕S7 | S5 | S4⊕S5 | S3 | S2⊕S3 |
| T14 | S2 | S1⊕S2 | S8 | S7⊕S8 | S6 | S5⊕S6 | S4 | S3⊕S4 |
| T15 | S3 | S2⊕S3 | S1 | S8⊕S1 | S7 | S6⊕S7 | S5 | S4⊕S5 |
| T16 | S4 | S3⊕S4 | S2 | S1⊕S2 | S8 | S7⊕S8 | S6 | S5⊕S6 |
| T17 | S1 | S8⊕S1 | S7 | S6⊕S7 | S5 | S4⊕S5 | S3 | S2⊕S3 |

Fig.14A
PRIOR ART

| TIME | OUTPUT OF DELAY 1 | OUTPUT OF DELAY 2 | OUTPUT OF DELAY 3 | OUTPUT OF DELAY 4 | OUTPUT OF DELAY 5 | OUTPUT OF DELAY 6 | OUTPUT OF DELAY 7 | OUTPUT OF DELAY 8 |
|---|---|---|---|---|---|---|---|---|
| T1 | D1 | | | | | | | |
| T2 | D2 | D1 | | | | | | |
| T3 | D3 | D2 | D1 | | | | | |
| T4 | D4 | D3 | D2 | D1 | | | | |
| T5 | D5 | D4 | D3 | D2 | D1 | | | |
| T6 | D6 | D5 | D4 | D3 | D2 | D1 | | |
| T7 | D7 | D6 | D5 | D4 | D3 | D2 | D1 | |
| T8 | D8 | D7 | D6 | D5 | D4 | D3 | D2 | D1 |
| T9 | D9 | D8 | D7 | D6 | D5 | D4 | D3 | D2 |
| T10 | D10 | D9 | D8 | D7 | D6 | D5 | D4 | D3 |
| T11 | D11 | D10 | D9 | D8 | D7 | D6 | D5 | D4 |
| T12 | D12 | D11 | D10 | D9 | D8 | D7 | D6 | D5 |
| T13 | D13 | D12 | D11 | D10 | D9 | D8 | D7 | D6 |
| T14 | D14 | D13 | D12 | D11 | D10 | D9 | D8 | D7 |
| T15 | D15 | D14 | D13 | D12 | D11 | D10 | D9 | D8 |
| T16 | D16 | D15 | D14 | D13 | D12 | D11 | D10 | D9 |
| T17 | D17 | D16 | D15 | D14 | D13 | D12 | D11 | D10 |

Fig.14B
PRIOR ART

| CODE 1 | CODE 2 | CODE 3 | CODE 4 | CODE 5 | CODE 6 | CODE 7 | CODE 8 |
|---|---|---|---|---|---|---|---|
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |
| S1 | S2 | S3 | S4 | S5 | S6 | S7 | S8 |

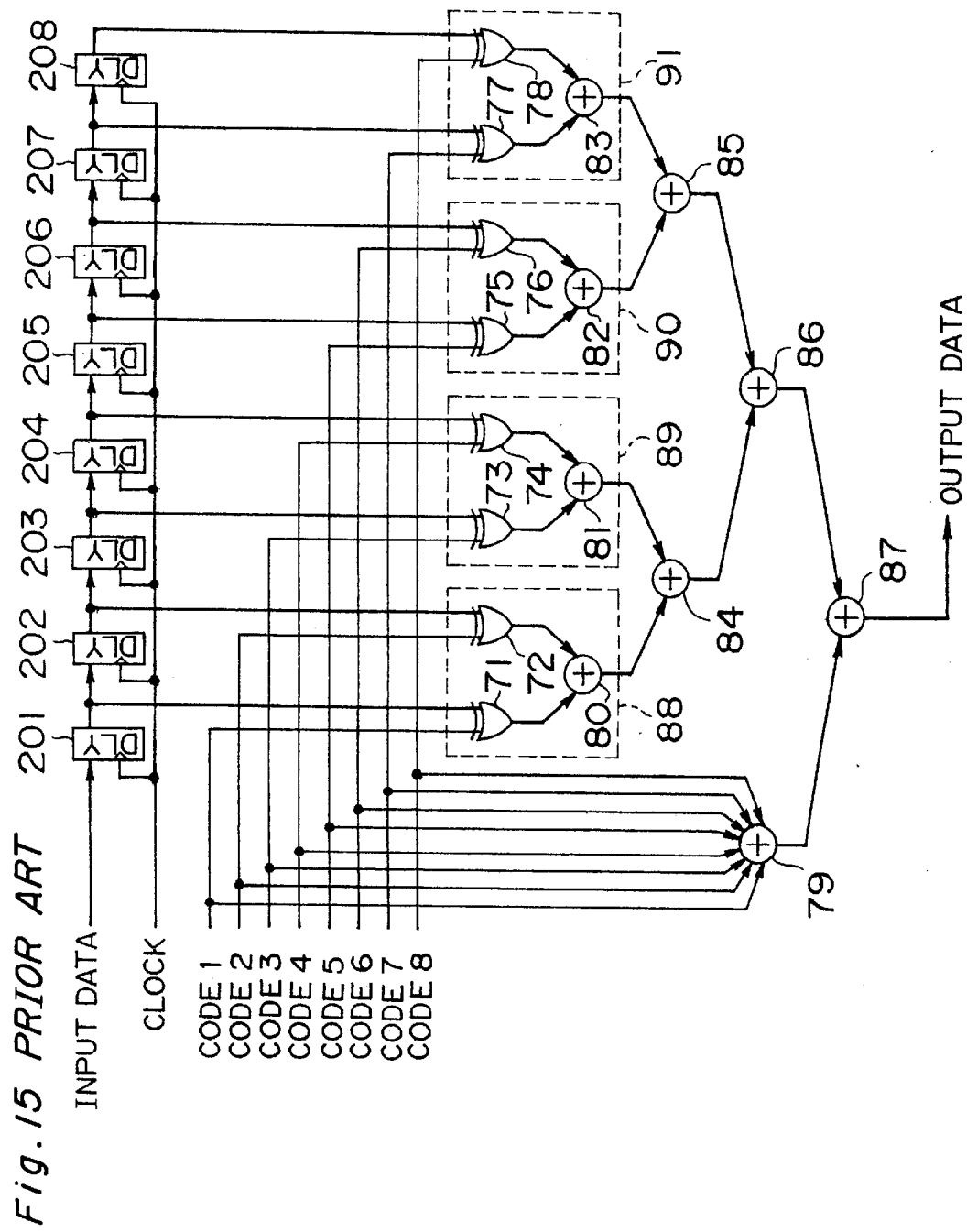

US 6,724,812 B2

MATCHING FILTER CALCULATING CORRELATION VALVE UTILIZING EXCLUSIVE-OR OF TWO DATA AND EXCLUSIVE-OR OF TWO CODES CORRESPONDING TO THE INPUT DATA

BACKGROUND OF THE INVENTION

The present invention relates to a digital matched filter for use in, for example, a spread spectrum communication receiver.

In a so-called direct sequence spread spectrum communication system that transmits an information signal multiplied by a wide-band despreading code and restores a received signal into the original narrow-band information signal by despreading the received signal, the information signal can be detected even when the carrier-to-noise ratio of a received radio wave is degraded. Therefore, the system is full of promise for code division multiple access, which is one of multiple access schemes for mobile communication systems.

According to this direct sequence spread spectrum communication system, the spread received data is despread to be restored to the original state, and therefore, it is required to synchronize the received data with the despreading code sequence. As an index of establishing synchronization, a correlation value of the received data and a despreading code sequence is used. A sum of products of signals of the received data and the corresponding despreading codes in an arbitrary phase is called a correlation value in the phase, and of the correlation values in various phases, the correlation value in a phase where the synchronization of the received data with the despreading code sequence is established takes the maximum value.

Then, the timing of the despreading code sequence can be synchronized to the received data by detecting the phase where the correlation value is maximized. A method using a matched filter is known as one of the methods for obtaining the correlation value in each phase.

FIG. 12 shows the construction of a matched filter of a first prior art example. In FIG. 12, Reference numerals 201 through 208 denote delay elements (DLY) for delaying input data, and the delay elements are connected in series so that the input data are successively shifted in synchronization with the rising edge of a clock. Reference numerals 56 through 63 denote multipliers, which multiply outputs of the delay elements 201 through 208 by the values of codes 1 through 8. In this case, the codes are made to take the value of "1" or "0". The output of each delay element is multiplied by one in the multipliers 56 through 63 when the value of the code is 0, and the output of each delay element is multiplied by −1 when the value of the code is 1. Reference numerals 64 through 70 denote adders, and outputs from the multipliers 56 through 63 are added by these adders 64 through 70 and outputted as output data.

Now, assuming that time domains T1, T2, T3, . . . are delimited in correspondence with the rising or leading edge of the clock, as shown in FIG. 13, and that D1, D2, D3, D4, D5, . . . are supplied as input data, then the contents of the delay elements 201 through 208 and of codes 1 through 8 in the time domains are as shown in FIGS. 14A and 14B, respectively. The input data D1, D2, D3, . . . are sequentially shifted in the delay elements 201 through 208, while the correlation value of the input data and a despreading code sequence of S1 to S8, which is fixed for codes 1 through 8, is calculated.

However, according to the aforementioned conventional construction, the circuit scale for the multipliers is large. In addition, the construction needs a number of multipliers equal to the number of codes in the code sequence. This leads to a problem that the circuit scale increases as the number of codes of the despreading code sequence increases and a problem that downsizing and reduction in consumption of power are hard to achieve.

As a solution to these problems, a technique using exclusive-OR circuits (referred to as 'XOR circuits' hereinafter) to execute operations equivalent to the multiplication has been proposed (Japanese Patent Laid-Open Publication No. HEI 9-107271).

FIG. 15 shows an example of the construction of a matched filter employing this technique. In FIG. 15, reference numerals 201 through 208 denote delay elements (DLY) for delaying input data, and these delay elements are connected in series so that the input data are successively shifted in synchronization with the rising edge of a clock. Reference numerals 71 through 78 denote XOR circuits, which execute an exclusive-OR operation of the outputs of the delay elements 201 through 208 and the codes 1 through 8. In this case, the codes are made to take the value of "1" or "0". The output of each delay element is output as it is when the corresponding code has a value of 0, while the output of each delay element is output, with each bit of the data inverted, when the code has a value of 1. Reference numeral 79 denotes an adder, which outputs the number of "1's" included in the codes 1 through 8. Reference numerals 80 through 87 denote adders, which add the outputs of the XOR circuits 71 through 78 and the output of the adder 79, so that the sum is supplied as output data.

In general, in order to multiply data represented by a specified number of bits by −1 using a two's complement, the bits are inverted and then one is added thereto. Thus, by inverting by XOR circuits 71 through 78 each bit of the output of the delay element 201 through 208 corresponding to the code assuming a value of 1, and then adding the value of the code of 1 via the adder 79, operations equivalent to the multiplication of the first prior art of FIG. 12 are achieved.

A part constructed of the XOR circuits 71 and 72 and the adder 80, a part constructed of the XOR circuits 73 and 74 and the adder 81, a part constructed of the XOR circuits 75 and 76 and the adder 82 and a part constructed of the XOR circuits 77 and 78 and the adder 83 are called correlation processors (C.P.) 88 through 91. Assuming that the delay elements 201 through 208 each have a 5-bit output, then the correlation processors 88 through 91 are each constructed of a circuit shown in FIG. 16.

In FIG. 16, input lines A4 through A0 are connected to the bits of the output of the delay element 201 or 203 or 205 or 207, input lines B4 through B0 are connected to the bits of the output of the delay element 202 or 204 or 206 or 208, an input line C is connected to the code 1 or 3 or 5 or 7, and an input line D is connected to the code 2 or 4 or 6 or 8. XOR circuits 92, 93, 94, 95 and 96 represent the XOR circuit 71 or 73 or 75 or 77 bit by bit. These XOR circuits execute an exclusive-OR operation of the signals of the input lines A4 through A0 and the signal of the input line C and output signals G4 through G0. XOR circuits 97, 98, 99, 100 and 101 represent the XOR 72 or 74 or 76 or 78 bit by bit and execute an exclusive-OR operation of the signals of the input lines B4 through B0 and the signal of the input line D, outputting signals H4 through H0.

The signals G4 through G0 and the signals H4 through H0 are added up in circuits 102 through 120 corresponding to the adder 80 or 81 or 82 or 83. An AND circuit 102 and an XOR circuit 107 execute an operation of signals G4 and H4, an AND circuit 103 and an XOR circuit 108 execute an operation of signals G3 and H3, and an AND circuit 104 and an XOR circuit 109 execute an operation of signals G2 and H2. Further, an AND circuit 105 and an XOR circuit 110 execute an operation of signals G1 and H1, and an AND circuit 106 and an XOR circuit 111 execute an operation of signals G0 and H0.

When the XOR circuit 107, 108, 109, 110 has an output of "0", a corresponding selector (SEL) 112, 113, 114, 115 selects the output of the AND circuit 102, 103, 104, 105 to produce an output. When the XOR circuit 107, 108, 109, 110 has an output of "1", the corresponding selector 112, 113, 114, 115 selects the output of the selector 113, 114, 115 or the output of an AND circuit 106, respectively, to produce an output. Carry signals F4, F3, F2, F1 and F0 of the digits are provided by the outputs of the selectors 112 through 115 and the AND circuit 106, and final addition results E5 through E1 are provided by the outputs of XOR circuits 116 through 120 and 111.

Now, assuming that time domains T1, T2, T3, . . . are delimited in correspondence with the rising or leading edge of the clock, as shown in FIG. 13, and that D1, D2, D3, D4, D5, . . . are supplied as input data, then the contents of the delay elements 201 through 208 and of codes 1 through 8 in the time domains are as shown in FIGS. 14A and 14B, respectively. The input data D1, D2, D3, . . . are sequentially shifted in the delay elements 201 through 208, while the correlation value of the input data and a despreading code sequence of S1 to S8, which is fixed for codes 1 through 8, is calculated.

The operation of the correlation processors 88 through 91 will be described herein taking the correlation processor 88 in the time domain T8 as an example. In this case, the bits of input data D8 have been supplied to the respective input lines A4 through A0 of the correlation processor shown in FIG. 16, and the bits of input data D7 have been supplied to the input lines B4 through B0. Further, the despreading code S2 has been supplied to the input line D, and the despreading code S1 has been supplied to the input line C. Assuming that the bits of input data D7 are D74 through D70, that the bits of the input data D8 are D84 through D80 and that i=1 to 4, then carry signals F4 through F0 and addition results E5 through E0 are calculated from the following expressions (1) to (5).

$$F0 = G0 \cdot H0 \quad (1)$$
$$= (C \oplus A0) \cdot (D \oplus B0)$$
$$= (S1 \oplus D80) \cdot (S2 \oplus D70)$$

$$Fi = \overline{(Gi \oplus Hi)} \cdot (Gi \oplus Hi) + (Gi \oplus Hi) \cdot Fi-1 \quad (2)$$
$$= (Gi \cdot Hi + \overline{Gi \cdot Hi}) \cdot (Gi \cdot Hi) + (Gi \oplus Hi) \cdot Fi-1$$
$$= \overline{(Gi \cdot Hi + Gi \cdot \overline{Hi})} \cdot (Gi \cdot Hi) + (Gi \oplus Hi) \cdot Fi-1$$
$$= Gi \cdot Hi + (Gi \oplus Hi) \cdot Fi-1$$
$$= (C \oplus Ai) \cdot (D \oplus Bi) + ((C \oplus Ai) \oplus (D \oplus Bi)) \cdot Fi-1$$
$$= (S1 \oplus D8i) \cdot (S2 \oplus D7i) + ((S1 \oplus D8i) \oplus (S2 \oplus D7i)) \cdot Fi-1$$

$$E0 = G0 \oplus H0 \quad (3)$$
$$= (C \oplus A0) \oplus (D \oplus B0)$$
$$= (S1 \oplus D80) \oplus (S2 \oplus D70)$$

$$Ei = (Gi \oplus Hi) \oplus Fi-1 \quad (4)$$
$$= (C \oplus Ai) \oplus (D \oplus Bi) \oplus Fi-1$$
$$= (S1 \oplus D8i) \oplus (S2 \oplus D7i) \oplus Fi-1$$

$$E5 = (G4 \oplus H4) \oplus F4 \quad (5)$$
$$= (C \oplus A4) \oplus (D \oplus B4) \oplus F4$$
$$= (S1 \oplus D84) \oplus (S2 \oplus D74) \oplus F4$$

Thus, the correlation between the input data D8 and D7 and the despreading codes S1 and S2 is calculated in the correlation processor 88.

According to the aforementioned construction, the multiplication operation is achieved by the exclusive-OR circuits without using any multipliers. Therefore, the circuit scale is made smaller than that of the prior art of FIG. 12 and the consumption of power can be lowered.

The aforementioned conventional architecture of FIGS. 15 and 16 needs 20 XOR circuits, five AND circuits and four selectors in each of the correlation processors 88, 89, 90 and 91, leading to a large circuit scale. In addition, regarding the number of codes, several hundreds of codes are practically needed although FIG. 15 shows only eight codes. One half of the number of the codes is the number of correlation processors. This leads to an increased circuit scale of the correlation processors, which will in turn, disadvantageously, considerably increase the consumption of power.

If the input data frequently changes like "010110100101", then the signal change is transmitted to all the delay elements 201 through 208. Thus, in this case also, the consumption of power will increase.

SUMMARY OF THE INVENTION

Accordingly, the object of the present invention is to solve the aforementioned problems and provide a matched filter capable of suppressing an increase of the circuit scale even if the number of codes increases, by reducing the circuit scale of the correlation processors and restraining the signal change of the delay systems.

In order to achieve the aforementioned object, the present invention provides a matched filter for calculating a correlation value between an input data sequence of a specified length and a code sequence of a specified length, comprising:

a circuit calculating an exclusive-OR of two input data;

a circuit calculating an exclusive-OR of two codes corresponding to the two input data, respectively; and a correlation calculating means that, using the exclusive-OR of the two input data, one of the two input data, the exclusive-OR of the two codes, and the code corresponding to one of the two input data, calculates a correlation value of the two input data and the two codes.

The provision of the circuit calculating an exclusive-OR of two input data and the circuit calculating an exclusive-OR of two codes corresponding to the two input data, according to the present invention, contributes to the simplification of the logic of the correlation calculating means (which, in one embodiment, comprises one or more correlation processors), and hence the reduction of the circuit scale of the correlation calculating means.

In one embodiment, the correlation calculating means calculates correlation values for a plurality of pairs of input data, said plurality of pairs of input data including at least one pair of consecutive input data.

In this case, the circuit calculating an exclusive-OR of two input data may include a plurality of circuits associated with each other to calculate the exclusive-OR of two input data in each of the plurality of pairs. Also, the circuit calculating an exclusive-OR of two codes may include a plurality of circuits each calculating an exclusive-OR of two codes corresponding to two input data in a pair. Then, the correlation calculating means may comprise a plurality of correlation processors each calculating a correlation value of two input data in a pair and two codes corresponding to the two input data, using the exclusive-OR of the two input data, one of the two input data, the exclusive-OR of the two codes, and the code corresponding to one of the two input data.

In this embodiment, because the two input data of at least one pair are consecutive input data, the configuration of the circuit calculating the exclusive-OR of these two input data can be simplified.

The plurality of pairs of input data may include two or more sequential pairs each consisting of two consecutive input data. In this case, the two consecutive input data in one pair and the two consecutive input data in a next pair also constitute consecutive input data. Then, the correlation calculating means sequentially uses the calculated exclusive-ORs of the pairs of consecutive two input data for the calculation of the correlation values.

Preferably, each of the plurality of pairs of input data may consist of two consecutive input data. This arrangement will obviate the need of executing an exclusive-OR operation of a new combination of input data.

In one embodiment, the exclusive-OR of the two input data and the one of the two input data are delayed by different delay systems, each of which includes delay elements.

In this case, the connection to the correlation calculating means can be simply achieved, and the signal change of the delay systems can be restrained, allowing the data to be shifted with a clock of a frequency lower than the frequency of change of the input data.

An identical clock may be used for delay elements subsequent to an initial delay element of each delay system. In this case, wiring for the clock can be easily made.

Further, an initial delay element of at least one delay system may be supplied with a result of a logic operation of outputs from other delay elements. This can obviate the need for increasing the number of delay elements.

In one embodiment, the delay systems include two or more delay systems delaying the exclusive-OR of the two input data and/or two or more delay systems delaying the one of the two input data.

With this arrangement, the clock frequency can be lowered.

In one embodiment, the correlation calculating means includes an operation means calculating an exclusive-OR of the exclusive-OR of the two input data and the exclusive-OR of the two codes corresponding to the two input data. Thus the correlation calculation or processing can be easily done. The operation means may comprise a plurality of exclusive-OR circuits.

The matched filter according to the present invention can be built in a large-scale integrated circuit. By so doing, the circuit scale and the consumption of power of the large-scale integrated circuit can be reduced.

Also, the large-scale integrated circuit incorporating the matched filter of the present invention can be used as a component of a communication system. In this case, the consumption of power of the communication system can be reduced.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A, 3B and 3C are charts of waveforms of clocks and a select signal in the matched filter of the first embodiment of the present invention;

FIG. 4 is a chart showing the operation of delay elements of the matched filter of the first embodiment;

FIG. 5 is a chart showing code inputs of the matched filter of the first embodiment;

FIG. 6 is a chart showing inputs of a correlation processor of the first embodiment;

FIG. 7 is a block diagram showing the matched filter of the second embodiment of the present invention;

FIGS. 8A, 8B, 8C, 8D, 8E and 8F are waveform charts of clocks and select signals in the second embodiment;

FIG. 9 is a chart showing the operation of delay elements of the matched filter of the second embodiment;

FIG. 10 is a chart showing code inputs of the second embodiment;

FIG. 11 is a chart showing inputs of correlation processors in the second embodiment;

FIGS. 14A and 14B are charts showing the operation of the first and second prior art matched filters, and code inputs, respectively;

FIG. 15 is a block diagram showing the second prior art matched filter; and

DETAILED DESCRIPTION OF THE PREFERRED EMBODIMENTS

Figure 1:
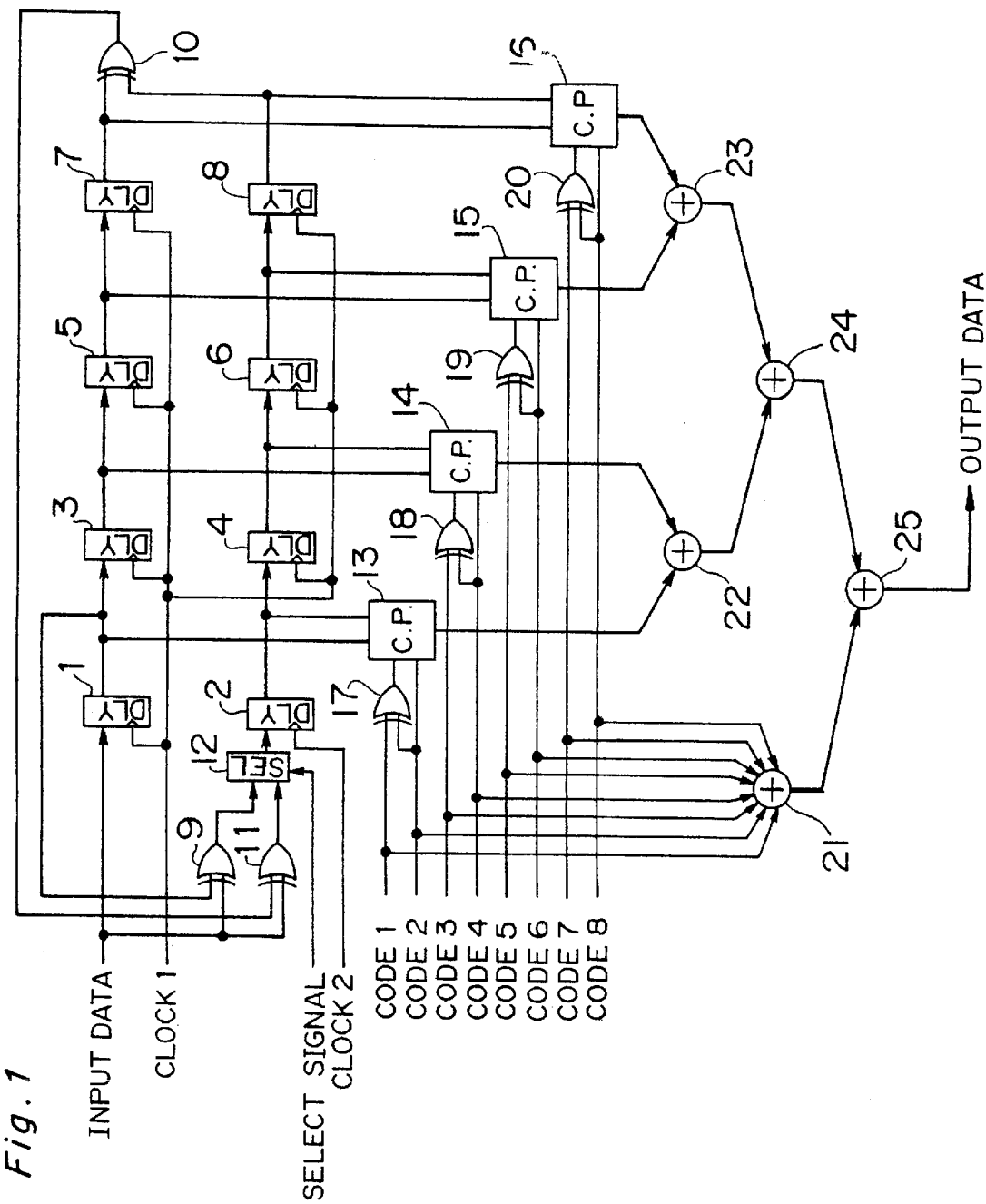
FIG. 1 is a block diagram showing a matched filter according to a first embodiment of the present invention.

The present invention will be described in detail below on the basis of the embodiments shown in the drawings.
(First Embodiment)

FIG. 1 is a block diagram of the matched filter of a first embodiment of the present invention. In FIG. 1, delay elements (DLY) 1, 3, 5 and 7 each hold input data. Delay elements 2, 4, 6 and 8 each hold the exclusive-OR of two input data. The delay elements 1, 3, 5 and 7 form a first delay system, while the delay elements 2, 4, 6 and 8 form a second delay system.

The delay elements 1, 3, 5 and 7 that constitute the first delay system are connected in series, and the delay elements 2, 4, 6 and 8 that constitute the second delay system are connected in series. With this arrangement, the delay elements subsequent to the first delay element in each delay system (i.e., the delay elements 3, 5, 7 and the delay elements 4, 6, 8) as well as the delay element 1 shift data in synchronization with the rising, or leading edge of clock 1.

When a select signal has a value of "0", a selector (SEL) 12 supplies the delay element 2 with a result of operation by an XOR circuit 9, namely an exclusive-OR of an output of the delay element 1 and an input data. On the other hand, when the select signal has a value of "1", the selector 12 supplies the delay element 2 with a result of operation by an XOR circuit 11, namely, an exclusive-OR of an input data and an operation result of an exclusive-OR of outputs of delay elements 7 and 8 by an XOR element 10.

On the other hand, the delay element 2 takes in data in synchronization with the rising edge of clock 2. The outputs of delay elements 1 and 2, the result of the exclusive-OR of the codes 1 and 2 calculated in an XOR circuit 17, and the code 2 are supplied to a correlation processor 13, which executes a correlation operation and outputs the result. Likewise, the outputs of delay elements 3 and 4, the result of the exclusive-OR of codes 3 and 4 operated in an XOR circuit 18, and code 4 are supplied to a correlation processor (C.P.) 14, which executes a correlation calculation or processing and outputs the result. The outputs of delay elements 5 and 6, the result of the exclusive-OR of codes 5 and 6 calculated in an XOR circuit 19, and code 6 are supplied to a correlation processor 15, which executes a correlation processing and outputs the result. The outputs of delay elements 7 and 8, the result of the exclusive-OR result of codes 7 and 8 operated in an XOR circuit 20, and code 8 are supplied to a correlation processor 16, which executes a correlation processing and outputs the result.

An adder 21 outputs the number of "ones" included in codes 1 through 8. An adder 22 adds the output of the correlation processor 13 and the output of the correlation processor 14 and supplies the resultant to an adder 24. An adder 23 adds the output of the correlation processor 15 and the output of the correlation processor 16 and supplies the resultant to the adder 24. The adder 24 adds the output of the adder 22 and the output of the adder 23 and supplies the resultant to an adder 25. This adder 25 adds an output from the adder 21 and an output from the adder 24, and outputs the resultant as output data.

Figure 2:
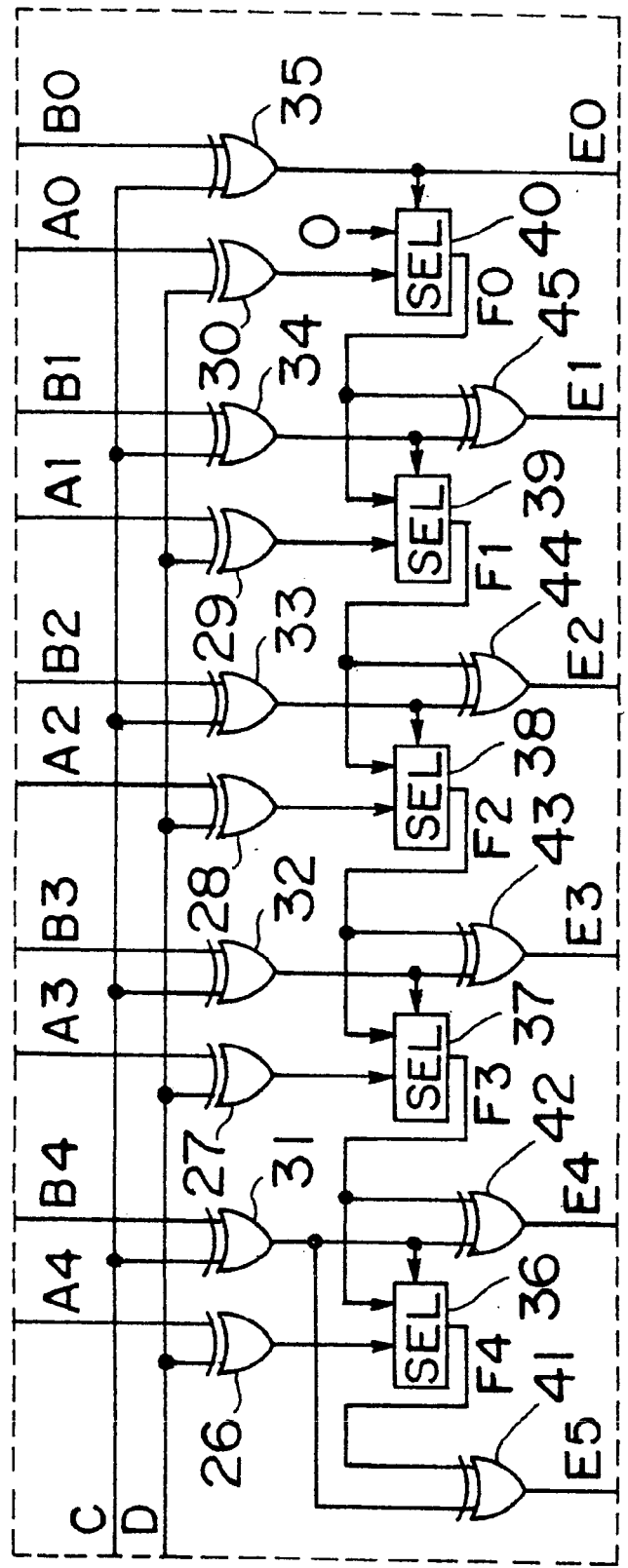
FIG. 2 is a circuit diagram of a correlation processor in the matched filter according to the first and a second embodiment of the present invention.
Figure 12:
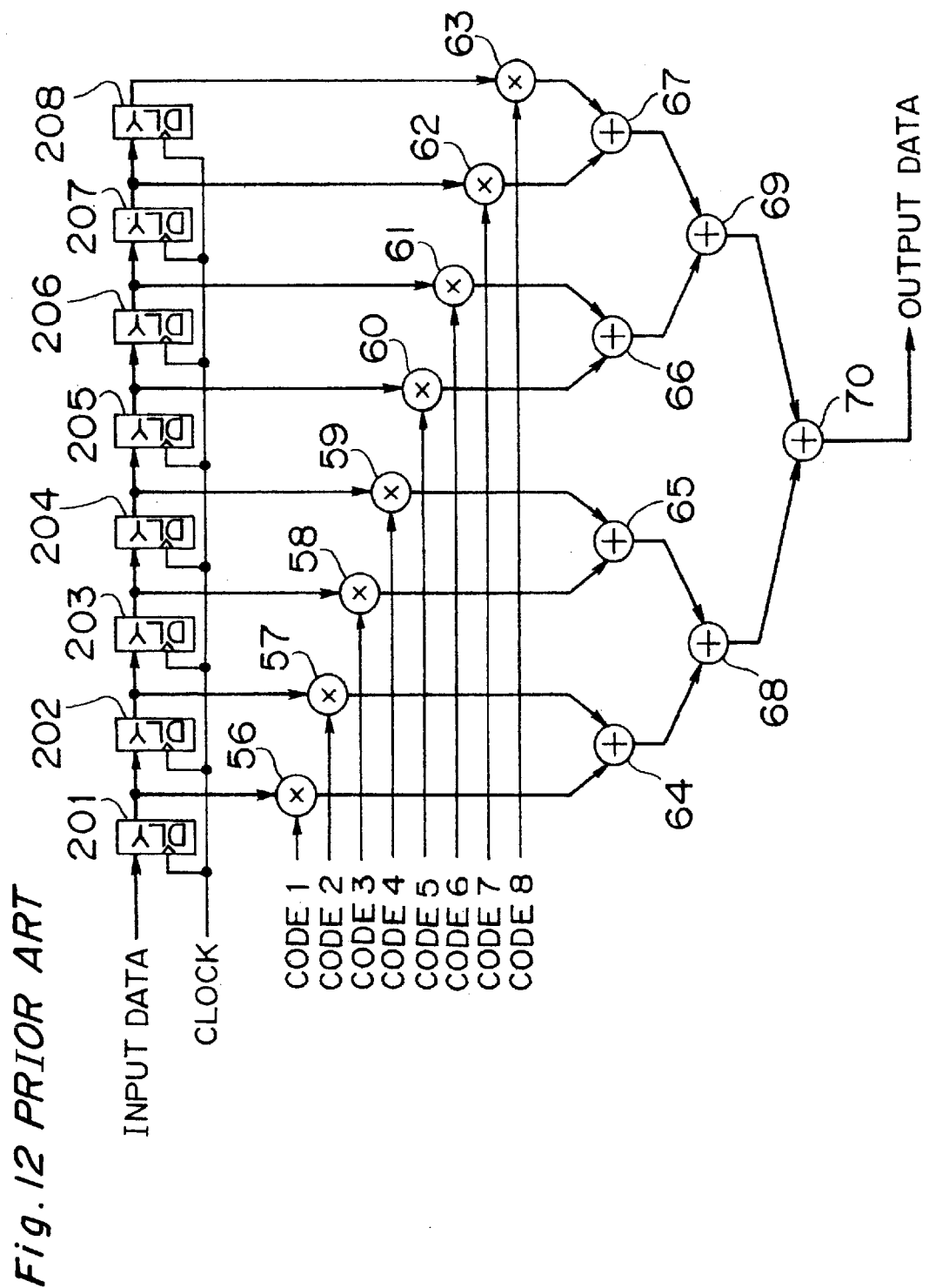
FIG. 12 is a block diagram showing a first prior art matched filter.
Figure 13:
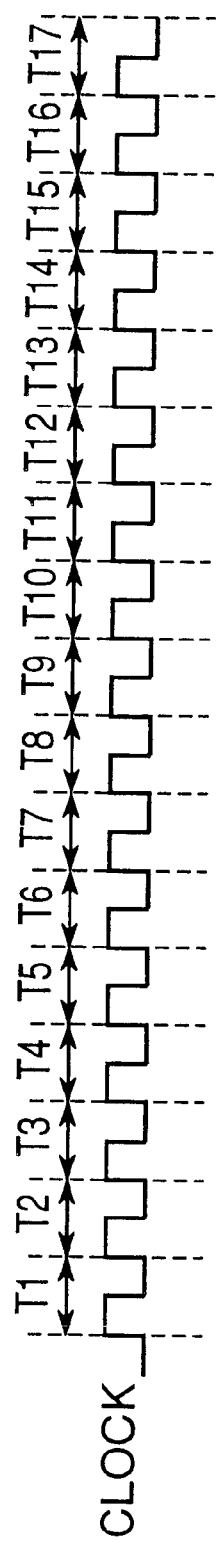
FIG. 13 is a waveform chart showing a clock used in the first and a second prior art matched filter.
Figure 16:
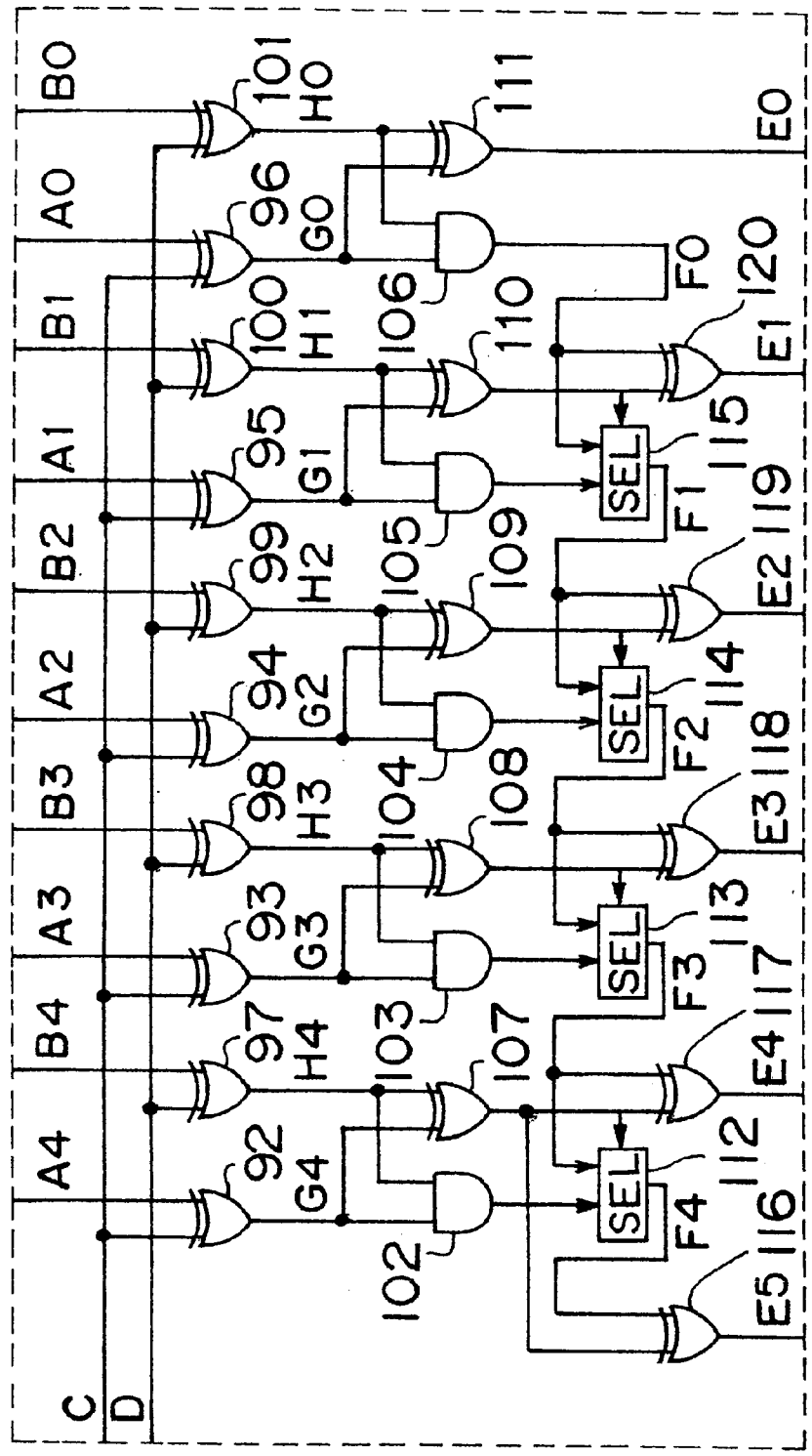
FIG. 16 is a diagram showing a correlation processor in the second prior art matched filter.

FIG. 2 shows the construction of the correlation processor 13 (14, 15, 16). Signal lines A4, A3, A2, A1 and A0 are connected to the bits of the output of the delay element 1 (3, 5, 7), and signal lines B4, B3, B2, B1 and B0 are connected to the bits of the output of the delay element 2 (4, 6, 8).

A signal line C is connected to the output of an XOR circuit 17 (18, 19, 20), and a signal line D is connected to the code 2 (4, 6, 8). An exclusive-OR operation of the signals inputted to the signal lines A4 through A0 and the signal inputted to the signal line D is executed in XOR circuits 26, 27, 28, 29 and 30, and an exclusive-OR operation of signal lines B4 through B0 and the signal line C is executed in XOR circuits 31, 32, 33, 34 and 35. Selectors 36, 37, 38, 39 and 40 select and output the outputs of the XOR circuits 26 through 30 when the XOR circuits 31 through 35 have an output of "0". When the XOR circuits 31 through 35 have an output of "1", the selectors 36, 37, 38, 39 and 40 select and output the outputs of the selectors 37, 38, 39 and 40 and "0", respectively.

The selectors 36 through 40 output carry signals F4, F3, F2, F1 and F0 for each figure, and XOR circuits 41, 42, 43, 44, 45 and 35 produce and output final addition results E5, E4, E3, E2 and E1.

FIGS. 3A–3C show waveforms of clocks 1 and 2 and a select signal, respectively. The select signal is generated so as to become "1" when both clock 1 and clock 2 concurrently rise and become "0" in the other cases. FIG. 4, FIG. 5 and FIG. 6 show, in the respective time domains, outputs of the delay elements 1 through 8, inputs to the codes 1 through 8, and inputs to the signal lines D and C of the correlation processors 13 through 16, respectively, where D1, D2, D3, D4, D5, . . . are supplied as the input data shown in FIG. 1.

As shown in FIG. 4, the input data D1, D3, D5, . . . are shifted to the delay elements 1, 3, 5 and 7 in synchronization with the rising edge of clock 1. On the other hand, the exclusive-OR of the latest input data and the input data seven time domains before and the exclusive-OR of the latest input data and the output of the delay element 1 are alternately taken in the delay element 2 in synchronization with the rising edge of clock 2. The output of the delay element 2 is shifted to the delay elements 4, 6 and 8 in synchronization with the rising edge of clock 1.

As shown in FIG. 5, for the codes 1 through 8, the despreading code sequence S1 through S8 is shifted in a go-around manner so that it is shifted alternately in the forward direction and in the reverse direction with regard to the codes 1 through 8, and an input D and an input C of the correlation processors 13 through 16 are determined as show in FIG. 6.

The operation of the correlation processor 13 through 16 will be described herein taking the correlation processor 13 in a time domain T8 as an example. In this stage, the bits of input data D7 are supplied to the respective input signal lines A4 through A0 of the correlation processor shown in FIG. 2, and the bits of the exclusive-OR of the input data D7 and D8 are supplied to the input signal lines B4 through B0. A despreading coefficient S2 is supplied to the signal line D, and the exclusive-OR of the despreading coefficients S1 and S2 is supplied to the signal line C.

In this case, assuming that the bits of the input data D7 are D74 through D70, that the bits of the input data D8 are D84 through D80 and that i=1 to 4, then the carry signals F4 through F0 and the addition results E5 through E0 are calculated using the following expressions (6) through (10).

$$\begin{aligned}
F0 &= \overline{(C \oplus B0)} \cdot (D \oplus A0) \\
&= \overline{((S1 \oplus S2) \oplus (D70 \oplus D80))} \cdot (S2 \oplus D70) \\
&= \overline{((S1 \oplus D80) \oplus (S2 + D70))} \cdot (S2 \oplus D70) \\
&= \overline{((S1 \oplus D80) \cdot (S2 + D70) + (S1 \oplus D80) \cdot \overline{(S2 + D70)})} \cdot \\
&\quad (S2 \oplus D70) \\
&= ((S1 \oplus D80) \cdot (S2 \oplus D70) + \overline{(S1 \oplus D80)} \cdot \overline{(S2 \oplus D70)}) \cdot \\
&\quad (S2 \oplus D70) \\
&= (S1 \oplus D80) \cdot (S2 \oplus D70)
\end{aligned}$$

(6)

$$Fi = \overline{(C \oplus Bi)} \cdot (D \oplus Ai) + (C \oplus Bi) \cdot Fi - 1 \quad (7)$$

$$= \overline{((S1 \oplus S2) \oplus (D7i \oplus D8i))} \cdot (S2 \oplus D7i) +$$

$$((S1 \oplus S2) \oplus (D7i \oplus D8i)) \cdot Fi - 1$$

$$= \overline{((S1 \oplus D8i) \cdot (S2 \oplus D7i))} \cdot (S2 \oplus D7i) +$$

$$((S1 \oplus D8i) \oplus (S2 \oplus D7i)) \cdot Fi - 1$$

$$= \overline{((S1 \oplus D8i) \cdot (S2 \oplus D7i) + (S1 \oplus D8i) \cdot \overline{(S2 \oplus D7i)})} \cdot$$

$$(S2 \oplus D7i) + ((S1 \oplus D8i) \oplus (S2 \oplus D7i)) \cdot Fi - 1$$

$$= ((S1 \oplus D8i) \cdot (S2 \oplus D7i) + \overline{(S1 \oplus D8i) \cdot (S2 \oplus D7i)}) \cdot$$

$$(S2 \oplus D7i) + ((S1 \oplus D8i) \oplus (S2 \oplus D7i)) \cdot Fi - 1$$

$$= (S1 \oplus D8i) \cdot (S2 \oplus D7i) + ((S1 \oplus D8i) \oplus$$

$$(S2 \oplus D7i)) \cdot Fi - 1$$

$$E0 = C \oplus B0 \quad (8)$$

$$= (S1 \oplus S2) \oplus (D70 \oplus D80)$$

$$= (S1 \oplus D80) \oplus (S2 \oplus D70)$$

$$Ei = (C \oplus Bi) \oplus Fi - 1 \quad (9)$$

$$= (S1 \oplus S2) \oplus (D7i \oplus D8i) \oplus Fi - 1$$

$$= (S1 \oplus D8i) \oplus (S2 \oplus D7i) \oplus Fi - 1$$

$$E5 = (C \oplus B4) \oplus F4 \quad (10)$$

$$= (S1 \oplus S2) \oplus (D74 \oplus D84) \oplus F4$$

$$= (S1 \oplus D84) \oplus (S2 \oplus D74) \oplus F4$$

The calculation results obtained by expressions (6) through (10) are equivalent to the calculation results obtained by expressions (1) through (5). Thus, the correlation processor 13 realizes the correlation calculations of input data D8 and D7 and the despreading codes S1 and S2.

By virtue of the provision of the circuits 9 and 11 for executing the exclusive-OR operation of two input data and the circuits 17 through 20 for executing the exclusive-OR operation of two codes corresponding to the two input data, the correlation processors 13 through 16 have a simplified logic by comparison with the conventional cases. With this arrangement, each of the correlation processors 13 through 16 can be constructed of 15 XOR circuits and five selectors, resulting in a reduced circuit scale by comparison with the conventional cases. Therefore, even if the number of codes increases, an increase in the circuit scale can be suppressed.

According to the above construction, two input data subject to the exclusive-OR operation in the time domains T2, T4, T6, . . . are consecutive input data like D1 and D2, D3 and D4, D5 and D6, and so on. Therefore, the circuit for executing the exclusive-OR operation of two input data is allowed to have a simplified configuration.

According to the above construction, the results of the exclusive-OR operation of the consecutive two input data of D1 and D2, D3 and D4, D5 and D6, . . . are successively used for the calculation of the correlation values. This obviates the need for executing an exclusive-OR operation of new combinations of input data D2 and D3, D4 and D5, D6 and D7, and so on.

According to the aforementioned construction, the exclusive-OR of two input data and one of two input data are delayed in different delay systems (the system of the delay elements 2, 4, 6 and 8 and the system of the delay elements 1, 3, 5 and 7). Therefore, it is easy to achieve connection to the correlation processors 13 through 16.

If the input data frequently changes like "0101101001011010", then the exclusive-OR, "11111111", of the odd-number data and the even-number data is shifted in the delay elements 4, 6 and 8, and therefore, the quantity of change of the signal becomes small, resulting in reduction of the consumption of power. If the number of codes increases, then the signal change is similarly restrained in delay elements subsequent to the delay element 8. The frequency of clock 1 is lower than the frequency of change of the input data, and therefore, the consumption of power is reduced.

According to the aforementioned construction, the identical clock 1 is used for the second and subsequent delay elements of each delay system. Therefore, the clock wiring can be easily made.

According to the aforementioned construction, the result of the exclusive-OR operation using the exclusive-OR D2, D4, D6, . . . of the outputs of the delay elements 7 and 8 and the input data D9, D11, D13, . . . is supplied to the first delay element 2 of the delay system constructed of the delay elements 2, 4, 6 and 8. This obviates the need of providing delay elements for retaining the data D2, D4, D6, . . . for the exclusive-OR operation of the data D9 and D2, the data D11 and D4, the data D13 and D6, and so on.

Further, according to the aforementioned construction, select signals to be supplied to the selectors 36 through 40 are obtained merely by executing the exclusive-OR operation of the exclusive-OR of two input data and the exclusive-OR of two codes corresponding to the two input data in the XOR circuits 31 through 35. Therefore, the correlating operations can be easily executed.

(Second Embodiment)

Next, FIG. 7 shows a block diagram of the matched filter of a second embodiment of the present invention. In FIG. 7, parts similar to or same as the parts shown in FIG. 1 are denoted by the same reference numerals used in FIG. 1, and reference numerals 1, 3, 5 and 7 denote delay elements for retaining input data, and reference numerals 2, 4, 6 and 8 denote delay elements for retaining the exclusive-OR of two input data. The delay elements 1 and 5, the delay elements 2 and 6, the delay elements 3 and 7 and the delay elements 4 and 8 form delay systems, respectively.

The delay elements 1 and 5 are connected in series, and the delay elements 2 and 6 are connected in series. Also, the delay elements 3 and 7 are connected in series, and the delay elements 4 and 8 are connected in series. Then, the second and subsequent delay elements of each delay system (in the FIG. 7 case, the delay elements 5, 7, 6 and 8) and the delay element 1 shift data in synchronization with the rising edge of clock 1. The delay elements 2, 3 and 4 shift data in synchronization with the rising edge of clocks 2, 3 and 4, respectively.

When select signal 1 represents "0", a selector 46 selects and supplies to the delay element 2 a result of the exclusive-OR operation executed in an XOR circuit 50 using the output of the delay element 1 and the input data as operands. When select signal 1 represents "1", the selector 46 selects and supplies to the delay element 2 a result of the exclusive-OR operation executed in an XOR circuit 52 using the exclusive-OR, obtained by an XOR circuit 51, of the outputs of the delay elements 5 and 6 and the input data as operands.

This delay element 2 takes in the data in synchronization with the rising edge of clock 2.

The selector 47 inputs the input data to the delay element 3 when select signal 1 is "0" and inputs the output of the delay element 7 to the delay element 3 when select signal 1 is "1". This delay element 3 retains the data in synchronization with the rising edge of clock 3.

When the select signals 1 and 2 are both "0", a selector 48, in association with a selector 49, selects and supplies to the delay element 4 a result of the exclusive-OR operation executed by an XOR circuit 53 using the output of the delay element 3 and the input data as operands. When select signal 1 is "0" but select signal 2 is "1", the selector 48, in association with the selector 49, selects and supplies to the delay element 4 a result of the exclusive-OR operation executed by an XOR circuit 55 using the exclusive-OR, obtained by an XOR circuit 54, of the outputs of the delay elements 3 and 4 and the input data as operands. When select signal 1 is "1", the selector 48 selects and supplies the output of the delay element 8 to the delay element 4. This delay element 4 takes in the data in synchronization with the rising edge of clock 4.

The correlation processor 13 is supplied with the outputs of the delay elements 1 and 2, the result of the exclusive-OR operation executed in an XOR circuit 17 using codes 1 and 2 as operands, and code 2. The correlation processor 13 calculates the correlation of them and outputs the result. The correlation processor 14 is supplied with the outputs of the delay elements 3 and 4, the result of the exclusive-OR operation executed in an XOR circuit 18 using codes 3 and 4 as operands, and code 4. The correlation processor 14 calculates the correlation of them and outputs the result. The correlation processor 15 is supplied with the outputs of the delay elements 5 and 6, the result of the exclusive-OR operation executed in an XOR circuit 19 using codes 5 and 6 as operands, and code 6. This correlation processor 15 calculates the correlation of them and outputs the result. The correlation processor 16 is supplied with the outputs of the delay elements 7 and 8, the result of the exclusive-OR operation executed in an XOR circuit 20 using codes 7 and 8 as operands, and code 8. This correlation processor 16 calculates the correlation of them and outputs the result.

An adder 21 outputs the number of "ones (1s)" included in the codes 1 through 8. Adders 22, 23, 24 and 25 add up the outputs from the correlation processors 13, 14, 15 and 16 and the output of the adder 21, and supply the resultants as output data. These correlation processors 13 through 16 are each constructed of the circuit shown in FIG. 2, similarly to the first embodiment.

FIGS. 8A through 8F show the waveforms of clocks 1 through 4 and select signals 1 and 2. Select signal 1 is generated so as to become "1" when clocks 1 through 4 concurrently rise and become "0" in the other cases. Select signal 2 is generated so as to become "1" when neither of clocks 1 and 2 rises but both clocks 3 and 4 rise and become "0" in the other cases.

FIG. 9, FIG. 10, and FIG. 11 show outputs of the delay elements 1 through 8, inputs to the codes 1 through 8 and an input D and an input C to the correlation processors 13 through 16, respectively, in each time domain when D1, D2, D3, D4, D5, . . . are supplied as input data.

As shown in FIG. 9, the input data D1, D3, D5, . . . are shifted to the delay elements 1, 5 and 7 in synchronization with the rising edge of clock 1. The delay element 2 takes in the exclusive-OR of the latest input data and the input data seven time-domains before or the exclusive-OR of the latest input data and the output of the delay element 1 in synchronization with the rising edge of clock 2. The delay element 3 takes in the latest input data or the input data six time-domains before in synchronization with the rising edge of clock 3.

The delay element 4 takes in the exclusive-OR of the input data six time-domains before and the input data five time-domains before or the exclusive-OR of the latest input data and the input data seven time-domains before or the exclusive-OR of the latest input data and the output of the delay element 3 in synchronization with the rising edge of clock 4. The outputs of the delay elements 2 and 4 are shifted to the delay elements 6 and 8, respectively, in synchronization with the rising edge of clock 1.

As shown in FIG. 10, for the codes 1 through 8, the despreading code sequence S1 through S8 is shifted in a go-around manner so that it is shifted alternately in the forward direction and in the reverse direction with regard to the codes 1 through 8, and an input D and an input C of the correlation processors 13 through 16 are determined as show in FIG. 11.

The operation of the correlation processor will be described herein with reference to FIG. 2 and taking the correlation processor 14 in the time domain T8 as an example. In this stage, in the correlation processor of FIG. 2, the lines A4 through A0 are supplied with the bits of input data D7, and the lines B4 through B0 are supplied with the bits of the exclusive-OR of the input data D7 and D8. The line D is supplied with the despreading coefficient S2, and the line C is supplied with the exclusive-OR of the despreading coefficients S1 and S2.

In this case, assuming that the bits of the input data D7 are D74 through D70, that the bits of the input data D8 are D84 through D80 and that i=1 to 4, then the carry signals F4 through F0 and the addition results E5 through E0 are calculated according to the aforementioned expressions (6) through (10), as in the first embodiment.

That is, the calculation results obtained by expressions (6) through (10) are equivalent to the calculation results obtained by expressions (1) through (5). Thus, the correlation processor 14 realizes the correlation calculations of input data D8 and D7 and the despreading codes S1 and S2.

By virtue of the provision of the circuits 50, 52, 53, and 55 for executing the exclusive-OR operation of two input data and the circuits 17 through 20 for executing the exclusive-OR operation of two codes corresponding to the two input data, the correlation processors 13 through 16 have a simplified logic. With this arrangement, each of the correlation processors 13 through 16 can be constructed of 15 XOR circuits and five selectors, resulting in a reduced circuit scale. Therefore, even if the number of codes increases, an increase in the circuit scale can be suppressed.

According to the above construction, two input data subject to the exclusive-OR operation in the time domains T2, T4, T6, . . . are consecutive input data like D1 and D2, D3 and D4, D5 and D6, and so on. Therefore, the circuit for executing the exclusive-OR operation of two input data is allowed to have a simplified configuration.

According to the above construction, the results of the exclusive-OR operation of the consecutive two input data of D1 and D2, D3 and D4, D5 and D6, . . . are successively used for the calculation of the correlation values. This obviates the need for executing an exclusive-OR operation of new combinations of input data D2 and D3, D4 and D5, D6 and D7, and so on.

According to the aforementioned construction, the exclusive-OR of two input data and one of two input data are delayed in different delay systems, specifically, the system including the delay elements 2 and 6, the system including the delay elements 4 and 8, the system including the delay elements 1 and 5, the system including the delay elements 3 and 7. Therefore, it is easy to achieve connection to the correlation processors 13 through 16.

If the input data frequently changes like "0101101001011010", then the exclusive-OR, "1111", of the 1st, 5th, . . . data and the 2nd, 6th, . . . data is retained in the delay element 6, and the exclusive-OR, "1111", of the 3rd, 7th, . . . data and the 4th, 8th, . . . data is retained in the delay element 8. Therefore, the quantity of change of the signal becomes small, resulting in reduction of the consumption of power. If the number of codes is increased, then the signal change is similarly restrained in even delay elements subsequent to the delay elements 6 and 8.

The frequency of clock 1 is lower than the frequency of change of the input data, and therefore, the consumed power is reduced.

According to the aforementioned construction, the identical clock 1 is used for the second and subsequent delay elements 5, 6, 7, 8 of each delay system. Therefore, wiring for the clock is easily made.

According to the aforementioned construction, the matched filter is arranged such that the result of the exclusive-OR operation using the exclusive-OR, D2, D4, D6, . . . , of the outputs of the delay elements 5, 6 and the input data D9, D13, D17, . . . is supplied to the first delay element 2 of the delay system constructed of the delay elements 2, 6. This obviates the need of providing delay elements for retaining the data D2, D6, D10, . . . for the exclusive-OR operation of the data D9 and D2, the data D13 and D6, the data D17 and D10, etc.

The result of the exclusive-OR operation of the exclusive-OR D4, D8, D12, . . . of the outputs of the delay elements 3 and 4 and the input data D11, D15, D19, . . . is supplied to the first delay element 4 of the delay system constructed of the delay elements 4 and 8. This obviates the need for providing delay elements for retaining the data D4, D8, D12, . . . for the exclusive-OR operation of the data D11 and D4, the data D15 and D8, the data D19 and D12, and so on.

The matched filter of the second embodiment has two delay systems for delaying the exclusive-OR of two input data, namely, a system constructed of the delay elements 2 and 6 and a system constructed of the delay elements 4 and 8 are provided. Also, the matched filter of the second embodiment has two delay systems for delaying one of two input data, namely, a system constructed of the delay elements 1 and 5 and a system constructed of the delay elements 3 and 7. With this arrangement, the frequency of clock 1 can be made lower than in the aforementioned first embodiment.

Eight delay elements are provided in this second embodiment. If further delay elements are used, the number of delay elements for shifting the data in synchronization with clock 1 is increased. Therefore, the effect of reducing the consumption of power by virtue of the reduction in the frequency of clock 1 becomes more prominent and significant.

Further, in the second embodiment, select signals to be supplied to the selectors 36 through 40 are obtained merely by executing the exclusive-OR operation of the exclusive-OR of two input data and the exclusive-OR of two codes corresponding to the two input data in the XOR circuits 31 through 35. Therefore, the correlating operations can be easily executed.

Although the selectors 36 through 40 are employed in the aforementioned first and second embodiments, the logic may be implemented by other logic circuits.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A matched filter for calculating a correlation value between an input data sequence of a specified length and a code sequence of a specified length, comprising:
    a circuit calculating an exclusive-OR of an input data and a delayed input data;
    a circuit calculating an exclusive-OR of two codes corresponding to the two input data, respectively; and
    a correlation calculating means that, using the exclusive-OR of the two input data, one of the two input data, the exclusive-OR of the two codes, and the code corresponding to one of the two input data, calculates a correlation value of the input data and the two codes.

2. The matched filter according to claim 1, wherein said correlation calculating means calculates correlation values for a plurality of pairs of input data, said plurality of pairs of input data including at least one pair of consecutive input data.

3. The matched filter according to claim 1, wherein
    said circuit calculating an exclusive-OR of two input data includes a plurality of circuits associated with each other to calculate an exclusive-OR of two input data in each of a plurality of pairs;
    said circuit calculating an exclusive-OR or two codes includes a corresponding to two input data in a pair, and wherein
        said correlation calculating means comprises a plurality of correlation processor circuits each calculating a correlation value of two input data in a pair and two codes corresponding to the two input data, using the exclusive-OR of the two input data, one of the two input data, the exclusive-OR of the two codes, and the code corresponding to one of the two input data.

4. The matched filter according to claim 2, wherein said plurality of pairs of input data include two or more sequential pairs each consisting of two consecutive input data, the two consecutive input data in one pair and the two consecutive input data in a next pair also constitute consecutive input data, and said correlation calculating means sequentially use the calculated exclusive-Ors of the pairs of consecutive two input data for the calculation of the correlation values.

5. The matched filter according to claim 4, wherein each of said plurality of pairs of input data consists of two consecutive input data.

6. The matched filter according to claim 1, wherein the exclusive-OR of the two input data and the one of the two input data are delayed by different delay systems.

7. The matched filter according to claim 6, wherein each delay system includes delay elements, and a single clock is used for delay elements subsequent to an initial delay element of each delay system.

8. The matched filter according to claim 6, wherein each delay system includes delay elements, and an initial delay element of at least one delay system is supplied with a result of a logic operation of outputs from other delay elements.

9. The matched filter according to claim 6, wherein said delay systems include two or more delay systems delaying the exclusive-OR of the two input data and/or two or more delay systems delaying the one of the two input data.

10. The matched filter according to claim 1, wherein said correlation calculating means includes:

an operation means calculating an exclusive-OR of the exclusive-OR of the two input data and the exclusive-OR of the two codes corresponding to the two input data.

11. The matched filter according to claim 10, wherein said operation means comprise a plurality of exclusive-OR circuits.

12. The matched filter according to claim 8, further comprising a selector provided with a binary select signal, wherein when the select signal is of a first binary value, said selector supplies an exclusive-OR delay element, for delaying the exclusive-OR of the two input data, with an exclusive-OR of a delayed one of the two input data and an input data, or when the select signal is a second binary value different from the first binary value, said selector supplies the exclusive-OR delay element with an exclusive-OR of an input data and a result of an exclusive-OR of the output of a delay element of the delay system for the input data and of a delay element of the delay system for the exclusive-OR delay elements.

13. A matched filter for calculating a correlation value between an input data sequence of a specified length and a code sequence of a specified length, comprising:

an input data circuit calculating an exclusive-OR of two input data, wherein
said input data circuit includes a first delay system and at least a second delay system, the first delay system having a plurality of delay elements connected in series, and the second delay system having a plurality of delay elements connected in series;
said second delay system is provided with an associated second input circuit, wherein
said second input circuit includes a first exclusive-OR circuit, a second exclusive-OR circuit, and a selector, said first exclusive-OR circuit calculates an exclusive-OR of an output of an initial delay element of said first delay system and an input data, said second exclusive-OR circuit calculates an exclusive-OR of an input data and a result of an exclusive-OR of outputs of said first delay system and said second delay system, said selector selects between the output of said first exclusive-OR circuit and said second exclusive-OR circuit based on a select signal and supplies the resulting selected signal to an initial delay element of said second delay system;

a circuit calculating an exclusive-OR of two codes corresponding to the two input data, respectively; and a correlation calculation means that, using the output of the initial delay element of the first delay system, the output of the initial delay element of the second delay system, the exclusive-OR of the two codes, and the code corresponding to one of the two input data, calculates a correlation value of the two input data and the two codes.

14. The matched filter according to claim 13, wherein said selector is provided with a binary select signal, wherein when the select signal is of a first binary value, said selector supplies a result of an exclusive-OR operation using a delayed input data and an input data, or when the select signal is a second binary value different from the first binary value, said selector supplies a result of an exclusive-OR operation of an exclusive-OR of outputs from the first delay system and the second delay system, and the input data.

* * * * *